April 12, 1949.  K. L. CURTIS ET AL  2,466,689
CONDENSER FED PLURAL RELAY SYSTEM
Filed April 27, 1943  4 Sheets-Sheet 1
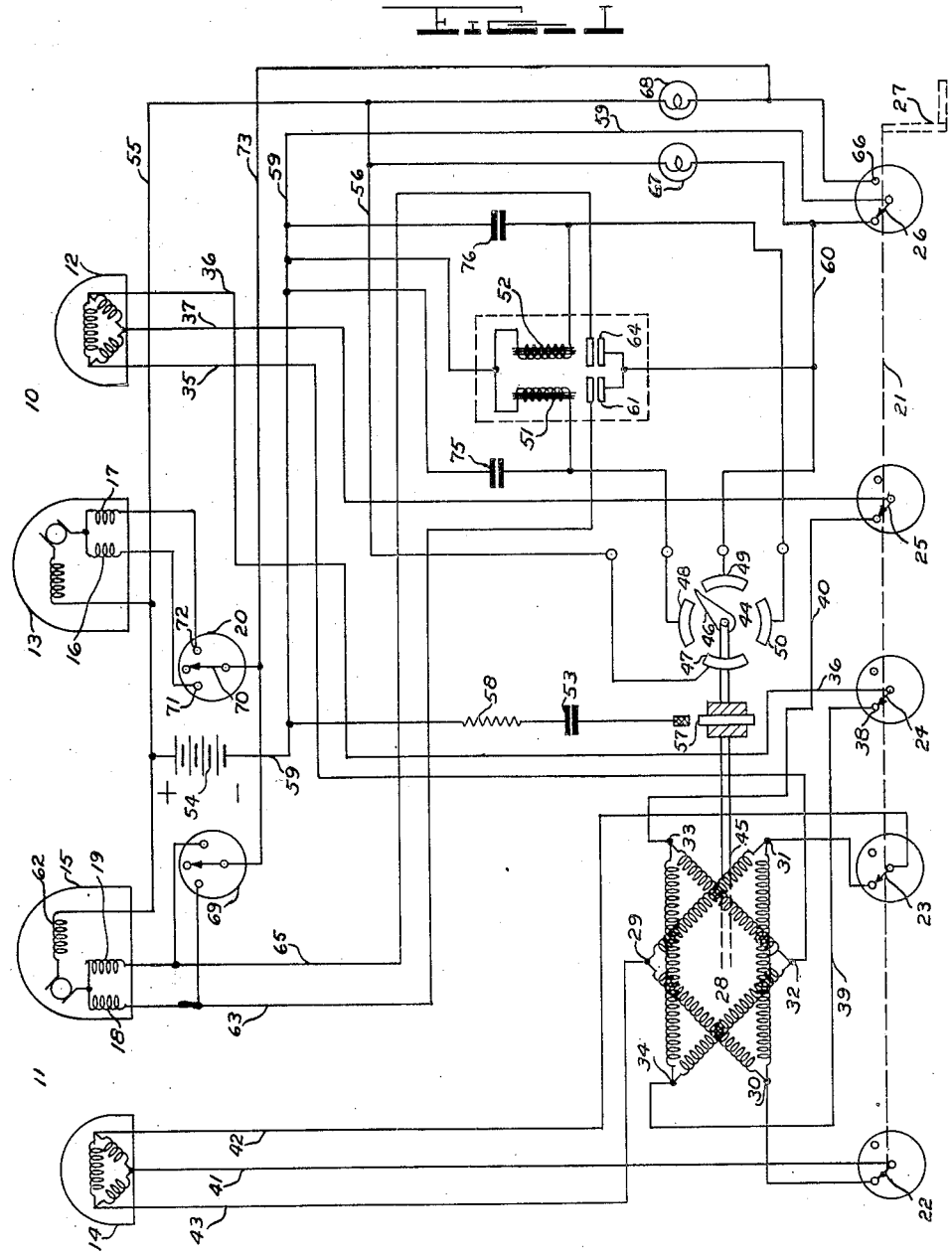
Inventor
KENNETH L. CURTIS
LAVERNE R. PHILPOTT April 12, 1949. K. L. CURTIS ET AL 2,466,689
CONDENSER FED PLURAL RELAY SYSTEM
Filed April 27, 1943 4 Sheets-Sheet 2
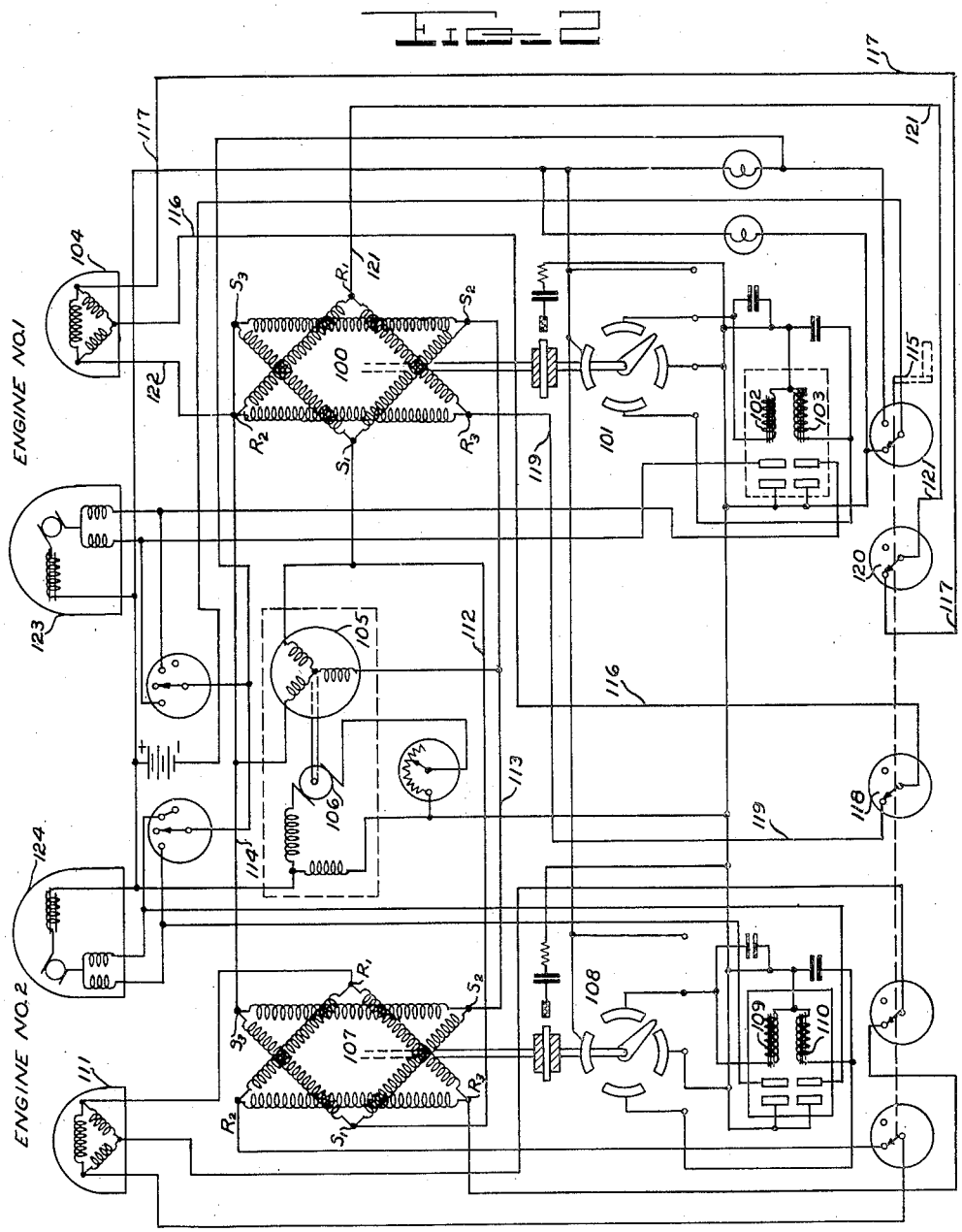
Inventor
KENNETH L. CURTIS
LAVERNE R. PHILPOTT
By
Attorney April 12, 1949. K. L. CURTIS ET AL 2,466,689
CONDENSER FED PLURAL RELAY SYSTEM
Filed April 27, 1943 4 Sheets-Sheet 3
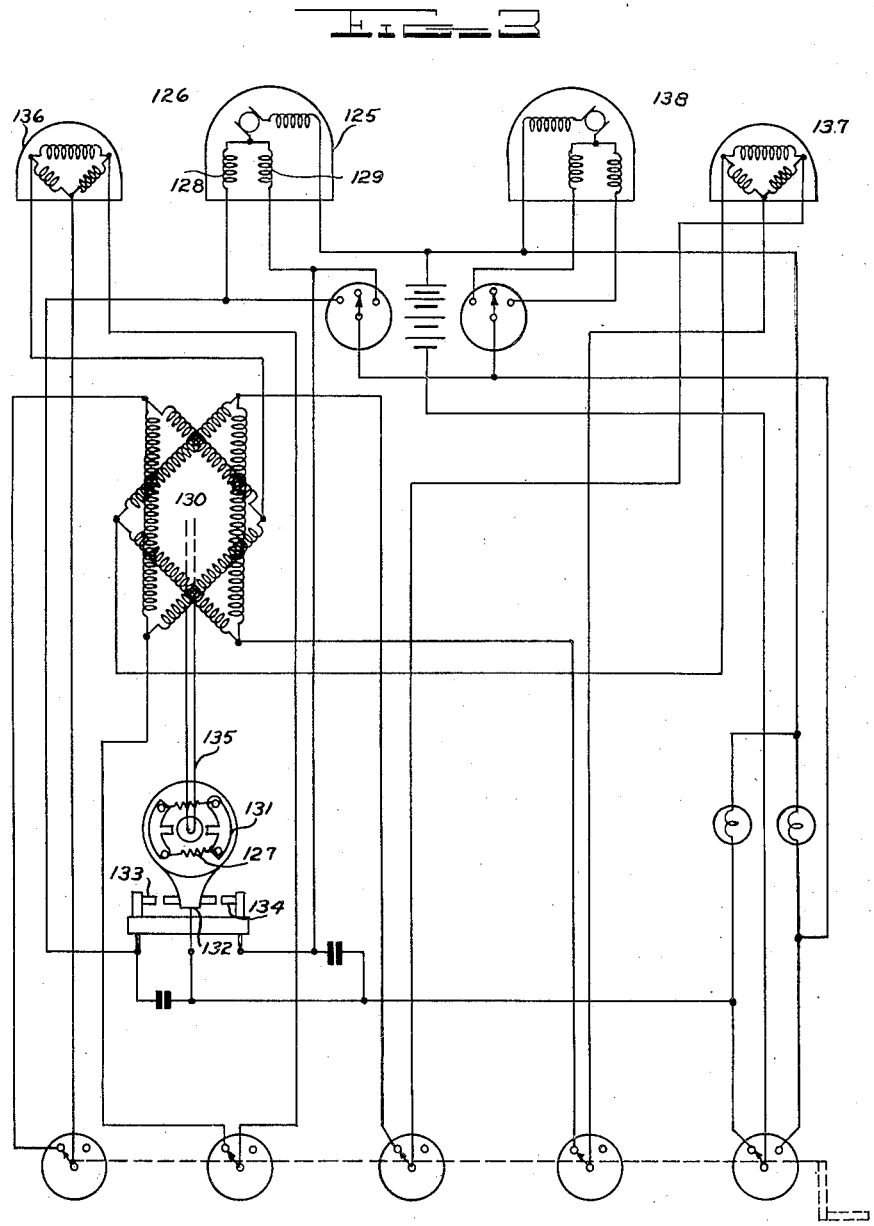
INVENTOR
KENNETH L. CURTIS
LAVERNE R. PHILPOTT

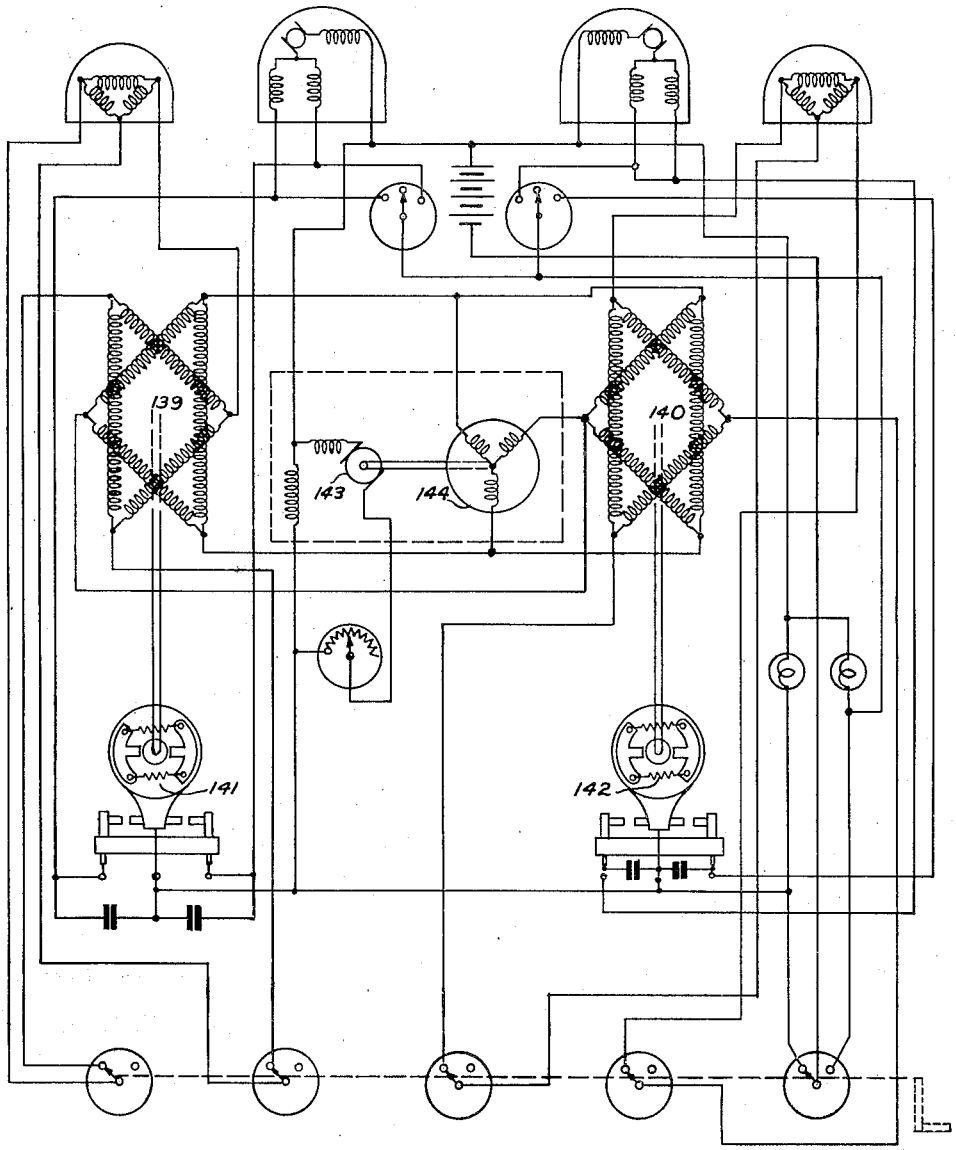

Patented Apr. 12, 1949

2,466,689

UNITED STATES PATENT OFFICE 2,466,689

CONDENSER FED PLURAL RELAY SYSTEM

Kenneth L. Curtis, United States Navy, and
Laverne R. Philpott, Washington, D. C.

Application April 27, 1943, Serial No. 484,744

2 Claims. (Cl. 175—320)

(Granted under the act of March 3, 1883, as
amended April 30, 1928; 370 O. G. 757)

The present invention relates in general to synchronizing systems with special reference to multiple engine power plants such as are used in multi-engine airplanes, and in particular to that type in which the speed of the engines is varied by variation of the pitch of the propellers driven by the engines and where the synchronization is required mainly to substantially avoid beat effects, or to slow down the beat to a harmless periodicity or to minimum duration. The invention applies equally well to the synchronizing of a simple engine with a master motor of any kind.

An important object of the invention is to effect a substantial reduction in weight and bulk of such systems without sacrifice of dependability in operation.

Other objects of the invention are simplification of the apparatus by reduction of the number of necessary components to a minimum, and the embodiment of such components in elements of minimum size and weight; the utilization of commercially available apparatus elements, and the reduction of maintenance to little more than bi-annual lubrication of the motor elements and occasional cleaning of the circuit control contacts.

These objects are attained in general by utilization of electrical induction means for comparing the frequency of a polyphase alternator driven by an engine to be controlled, with the frequency of a polyphase alternator driven by a master motor which latter may be one of the engines of a group of engines to be synchronized. This comparison is accomplished through an electric motor of the differential Selsyn type operating as a polyphase, differential motor to effect rotation of its shaft in either of two opposite directions according as to whether the frequency of the engine alternator is greater or less than the master-motor alternator, and to maintain the motor shaft stationary when the two alternators are in synchronism, the speed of the motor shaft varying directly as the difference between the two frequencies. These variations in direction and speed of rotation of the differential motor are translated respectively into a variation in pitch and rate of change of pitch of the propeller by rotary, selective impulse sending means operated by the differential motor and responsive to rotation in one or the other direction to increase or decrease the pitch of the propeller in unit amounts of adjustment, and responding to variations in speed of rotation to vary the frequency of application of such unit amounts of adjustment.

The invention may be embodied either in a non-hunting system or a high-speed hunting system.

Various other objects and advantages of the invention will become apparent from a perusal of the following specification and the drawings accompanying same.

In the drawings:

Fig. 1 is a schematic diagram of the circuit and apparatus arrangement for a non-hunting two-engine system, with one of the engines serving as a master motor;

Fig. 2 is a diagram of a similar system utilizing a master motor operating independently of the engines;

Fig. 3 is a diagram of the high-speed hunting system applied to a two-engine power plant utilizing one of the engines as the master motor, and Fig. 4 is a diagram showing a two-engine high speed hunting system utilizing a master motor separate from the engines.

Referring to the drawings in detail, and first to Fig. 1, the numerals 10 and 11 indicate the locations or stations of the two engines to be synchronized. For the sake of clearness the engines are not shown but are represented by such stations 10 and 11, and such associated parts as are essential to the diagram, for example, the engine alternators 12 and 14 and the propeller pitch-control motors 13 and 15, associated with the engines 10 and 11, respectively. One of the engines 10 is used as the master engine, and the other, 11, as the slave or controlled engine. Each of the propeller pitch-control motors, for example the motor 13, is provided with differentially wound field coils 16 and 17 for reverse operation of the motor, for example coil 16, for operating the motor in a direction to increase the propeller pitch and coil 17 for operating in a direction to decrease the pitch. Similarly the motor 15 is provided with increase and decrease field windings 18 and 19, respectively. Because the engine 10 functions as a master engine or master motor its propeller pitch-control motor is controlled directly from a manual control switch 20 for establishing a fixed adjustment of its propeller, the engine speed being controlled by the pilot in the usual manner of a single engine power plant. The system is here shown in condition for automatic control which is established through adjustment of a 5-gang switch 21 consisting of a group of 5 contact wipers 22 to 26 operated by a common crank element 27 to switch the system from automatic control to manual control.

The engine alternators 12 and 14 are arranged to be driven in fixed and like ratio to their respective engines 10 and 11 preferably by direct connection to the engine shafts and are in the form of polyphase alternators. For comparing the speeds of the two alternators I make use of an induction motor of the differential Selsyn type, that is a polyphase differential motor, indicated at 28. As here indicated diagrammatically, the motor is provided with a three-phase distributed rotor winding with which connection is made through the three-phase terminals 29, 30 and 31, while the stator is provided with a three-phase distributed winding having connecting terminals 32, 33 and 34. The stator of the comparing motor 28 is arranged to be excited by the master engine generator 12 through the three-phase conductors 35, 36 and 37, the conductor 35 connecting directly with the stator terminal 32, while the conductor 36 is connected through wiper 24, contact 38 of the gang switch and conductor 39 to stator terminal 34, and conductor 37 connected through wiper 25 of the gang switch and conductor 40 to stator terminal 33. Similarly the rotor of the comparing motor 28 is connected for excitation by the alternator 14 through conductors 41 and 42 which lead through wiper contacts 22 and 23 to the rotor terminals 30 and 31, respectively, and conductor 43 which leads directly to rotor terminal 29.

Control of the pitch control-motor 15 of the controlled engine 11 is effected by means of a two-directional rotary switch 44 driven by the comparing differential motor 28 through the motor shaft 45, and comprising a rotary wiper 46 arranged to sweep over a set of four segmental contact bars 47 to 50 for effecting a transmission of current impulses to one or the other of a pair of control relays 51 and 52 respectively, according to the direction of rotation of the switch, the relays 51 and 52 controlling the increase and decrease field windings, respectively, of the controlled engine 11. This selective function of the rotary switch 44, in response to direction of rotation, is accomplished through the use of a condenser 53 arranged to be charged through a low resistance 58 upon engagement of the wiper 46 with contact 47 over a charging circuit supplied by the ship's battery 54 which circuit may be traced from the plus side of battery over conductor 55, branch conductor 56, contact segment 47, wiper 46, slip ring connection 57 to condenser 53 and back to the minus terminal of the battery by way of resistance element 58 and the minus bus-wire 59. The purpose of the low resistance 58 is to prevent burning or welding of the contacts 46 and 47 by limiting the volume of charging current flowing to the uncharged condenser. With the switch wiper 46 travelling, for example, in a clockwise direction, it will first make contact with the contact 48 after leaving 47 thus completing a discharge circuit for the condenser for energizing the increase relay 51 which energizing circuit may be traced from condenser 53, slip ring contacts 57, wiper 46 and contact 48 to the energizing winding of relay 51 and back to the other side of the condenser by way of the minus-bus conductor 59 and resistance 58. A holding condenser 75 permanently connected across the terminals of the relay, taking on a charge from the condenser 53, insures operation of the relay and a continued energization thereof for a given short period after disengagement of contacts 46 and 48, even when engagement of these contacts is of very brief duration. Continued movement of the wiper 46 in a clockwise direction brings it into engagement with contact 49 to effect a substantially complete discharge of the condenser over the circuit extending through conductor 60, gang switch wiper 26, negative bus conductor 59 and resistance 58 to the negative side of the condenser. A substantially complete discharge of the condenser is thus assured before a continued clockwise movement of the wiper 46 can bring it into engagement with the stationary contact 50 leading to the decrease relay 52. Continued movement of the switch in this direction will again bring the wiper 46 into engagement with contact 47 for recharging the condenser for another current impulse to the increase relay 51 and condenser 75. Thus continued movement of the switch 44 in a clockwise direction will result in the sending of repeated impulses to the condenser 75 and the energizing winding of the increase relay C. Each actuation of the relay 51 results in a closure of its contacts 61 effecting a closure of the circuit of the increase field-coil 18 of the propeller adjusting motor 15 which circuit may be traced from the battery 54 over the plus bus-wire 55, armature winding 62 of the pitch-control motor 15, field winding 18, conductor 63, contact 61, gang switch wiper 26 and back to battery by way of the minus bus conductor 59. There is thus effected a notching adjustment of the propeller pitch through unit movements of the pitch-control motor.

Similarly, a counter-clockwise rotation of the switch 44 will cause the wiper 46 to first engage contact 50 after leaving charging contact 47 resulting in a selection of the decrease relay 52 for energization by the current impulses from condenser 53, any charge remaining in the condenser after the wiper leaves contact 50 being dissipated through contact 49 before the contact 48 is reached thus assuring against operation of the increase relay 51 in the counter-clockwise rotation of the switch. Each energization of the decrease relay 52 results in a closure of its contacts 64, completing an energizing circuit for the decrease field-winding 19 of pitch-control motor 15 over a path which may be traced from the plus side of battery through armature winding 62, field-winding 19, conductor 65, contacts 64, gang switch wiper 26 and back to battery over minus bus wire 59.

The phases of the two-engine alternators 12 and 14 are connected to the stator and rotor windings of the differential motor 28 in such order that the magnetic fields of both will rotate in the same direction, so that the rotor will remain stationary when the two polyphase sources are at the same frequency and will rotate clockwise or counter-clockwise according as to whether the speed of rotation of the magnetic field produced in the rotor by the alternator 14 is greater or rotation of the rotor will be directly proportional to the difference between the speed of rotation of the two fields.

From the above it will be seen that with the phases of the engine generators 12 and 14 connected to the comparing, differential motor 28 in a manner to cause the rotor to rotate clockwise upon an increase in frequency of the generator 14 over that of the generator 12 and to rotate counter-clockwise upon a decrease in frequency to below that of the generator 12, an increase in the speed of the controlled engine 11 will result in an increase in pitch of the propeller of that engine under a notching control in unit steps of adjustment repeated until its speed is brought down to substantially that of the master engine whereupon the rotor of the differential motor will cease to move. Here adjustment will cease due to discontinuation of movement of the rotary switch 44. Similarly, a decrease in speed of the controlled engine relative to that of the master engine, resulting in a counter-clockwise movement of the rotary switch 44 will effect a decrease in adjustment of the propeller pitch of the controlled engine under a notching control in uniform steps until its speed is brought up to that of the master engine. Here, also, the rate of stepping will be in proportion to the difference of speed so that proportionality of rate of adjustment is obtained in both instances. This notching adjustment will occur and continue during such slight departures as will not result in a rotation of switch 44 at a speed high enough to maintain the relay continuously energized, the notching continuing until substantial synchronism is reached. During a wider departure the switch 44, rotating at higher speed, will supply charging impulses to condenser 75 or 76, as the case may be, at a rate sufficient to maintain continuous energization of the pitch adjusting motor, locking in the control until the amount of departure is reduced to where notching again becomes desirable.

For manual control, the gang switch 21 is rotated to swing the wipers 22 to 25 to the right out of engagement with their respective wired contacts and to move the wiper 26 from the contact 26 to the contact 66, which disconnects two of the phases of the engine alternators from the comparing motor 28, by opening the connections through wipers 22 to 25 and switching the minus battery bus-wire 59 from its connection with the automatic control indicator lamp 67 through gang switch contact 26 to the manual control indicator lamp 68. The automatic control being rendered ineffective, the propeller switch adjustment is now under the control of only the manual switches 69 and 20. Each of these switches, for example 20, comprises a movable contact 70, preferably biased in the neutral position shown in any suitable manner as by a spring, and arranged to be moved, manually, into engagement with either the increase or decrease contacts 71 or 72. As will be clear from the diagram, closure of the contacts 70 and 71 will energize pitch-adjusting motor 13 under control of the pitch-increase field winding 16 while closure of the contacts 70 and 72 will effect energization under control of the pitch-decrease field 17. Similarly the manual pitch-control switch 69 affords control of the pitch-adjusting motor 15. Both of these manual pitch-control circuits pass from the positive side of battery through the pitch-adjusting motors 13 and 15 and their respective manual control switches to the negative side of battery by way of a common return conductor 73 and manual control contact 66 and wiper 26 of the gang switch 21 whereby the manual control switches 20 and 69 are effective only when the gang switch is in the manual position.

Referring to Fig. 2, here is shown a non-hunting synchronizing system similar to that of Fig. 1 but utilizing a separate master motor for controlling both engines. As each engine is a controlled engine they are each provided with a control unit consisting, for example in the case of engine No. 1, of a comparing motor 100 operating an impulse sending switch 101, and a set of increase and decrease control relays 102 and 103, the control unit operating under joint control of the engine-alternator 104 of engine No. 1 and an alternator 105, preferably a permanent magnet, three-phase alternator, driven by the master motor 106, the joint control being similar in all respects to that of the comparing motor 28 of Fig. 1 by the engine alternators of the controlled and master engines of that system. Similarly, the control unit of the engine No. 2 consisting of the comparing motor 107, rotary switch 108 and increase and decrease control relays 109 and 110, is jointly controlled by the alternator 111 of its associated engine and the master motor alternator 105. The master motor 106 may be of any known or other suitable type of adjustable, constant speed motor capable of adjustment at will to the engine speed desired to be maintained. The master motor alternator 105 driven by the master motor has its three-phase output connected in multiple with the stator winding terminals 51, 52 and 53 of both of the comparing differential motors 100 and 107 directly by way of the three conductors 112, 113 and 114. Excitation of the rotor winding of the comparing differential motor 100 by the engine alternator 104 under control of the gang switch 115 is obtained by connection of two of the output phase conductors 116 and 117 of alternator 104 to the rotor-winding terminals of the differential motor through the gang switch, the phase conductor 116 being connected through contact 118 of the gang switch and conductor 119, to rotor terminal R₃, while the phase conductor 117 is connected through contact 120 and conductor 121 to another rotor terminal R₁. The third phase conductor 122 of the alternator 104 is permanently connected to the remaining terminal R₂. The alternator 111 of engine No. 2 is connected with the rotor-winding terminals of the comparing motor 107 in a manner similar in all respects to that just described for the rotor of motor 100. Control of the pitch-control motors 123 and 124 by their respective control relays is the same as that described in detail in connection with Fig. 1. The present modification thus operates in a manner similar in all respects to that of the former except that the two engines are controlled in common from the master control motor 106 and independently of each other.

The modification of Fig. 3 is similar to the system shown in Fig. 1 except that the pitch-control motor 125 of the controlled motor 126 is controlled by an increase-decrease selector switch 127 operable selectively to maintain energization of one or the other of the differential field windings 128, 129 of the pitch control motor during the existence of a difference in speed between the master engine and the controlled engine, the system consequently operating as a high speed hunting system. Here the selector switch 127 is driven by the comparing differential motor 130 through a spring loaded friction clutch 131 so as to move the contact element 132 into engagement with one or the other of the increase and decrease contacts 133 and 134, respectively, according as to whether the motor shaft 135 is rotated in a clockwise or counter-clockwise direction and to maintain contact during such rotation and thereafter until a change in direction of rotation takes place. The order of the phase connections from the engine alternators 136 and 137 to the rotor and stator windings, respectively, of the comparing motor 130, is selected such that the motor shaft 135 will rotate clockwise upon an increase in speed of the controlled engine 126 over that of the master engine 138, and counter-clockwise upon a decrease in speed of the controlled engine relative to that of the master engine.

With the circuit connections established as shown, any increase in speed of the controlled engine over that established by the master engine will result in clockwise rotation of the motor shaft 135, the selector switch 127 moving with it until the contact 132 engages contact 133, after which the slipping of the spring clutch permits the movable contact to remain in engagement with the pitch-increase control contact 133 during continued rotation of the motor in the same direction and during subsequent non-rotation and until rotation takes place in an opposite direction. Engagement of contacts 132 and 133 completes the circuit of the pitch-increase field-winding 128 of the pitch-control motor, whereupon the latter is operated to continuously increase the propeller pitch which results in a decrease in engine speed. This action is continued so long as the controlled engine remains at a speed above that of the master engine and until after its speed has been reduced to substantially below that of the master engine, whereupon the selector switch 127 will be rotated in a counter-clockwise direction separating the contacts 132 and 133 and closing the contacts 132 and 134 to energize the decrease winding of the pitch-control motor 125 which latter now operates to decrease the pitch with consequent increase in engine speed. Thus the contacts 132 and 133 will have remained engaged during the stationary condition of the motor shaft 135 for the brief period in which the speed of the controlled engine was in substantially absolute synchronism with the speed of the master engine in changing from overspeed to underspeed. A similar action takes place with regard to contacts 132 and 134 during underspeed and during change from underspeed to overspeed, effected through reverse operation of the pitch control motor by the pitch-decrease field-winding 129. This cycle of operation is thus repeated continuously as a high-speed hunting operation of the controlled engine with the result that any variation in speed will be too slight to produce an objectionable beat, and any beat product will be of a duration too brief to result in any detrimental effects.

The modification shown in Fig. 4 is similar to that of Fig. 2 except that the comparing motors 139 and 140 effect a high-speed hunting control of their respective engines each through a selector switch 141 and 142, respectively, like the switch 127 of Fig. 3. It will be clear from the diagram that the operation of Fig. 4 is the same as that of Fig. 3 except that the speed of each engine is controlled by the master motor 143, through action of the master motor alternator upon the comparing induction motors 139 and 140 in a manner similar in all respects to the action of the master-motor alternator 105 of Fig. 2 upon the comparing motors 107 and 101.

It will be noted that in the various modifications the control functions of a master engine and a master motor are the same, a master engine taking on the double function of master motor and power unit; consequently throughout the claims the term "master motor" is intended to include either a motor serving this function alone such as the master motors of Figs. 2 and 4, or the master engines of Figs. 1 and 3 in their function as master motors.

While certain specific embodiments of the invention are herein described in detail for the sake of disclosure, it is to be understood that the invention is not limited to such specific embodiments but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. A two-directional notching control circuit comprising a pair of notching control relays one for each direction, each having a holding condenser connected in shunt therewith, a common current supply condenser for both relays, a source of charging current for said common condenser, a discharge circuit and a reversible rotary switch operable in one direction of rotation to connect the common condenser successively with the source of current, one only of said relays, said discharging circuit, the other relay only and again with the source of current to complete a cycle repeatable in continued rotation of the switch in said one direction, said rotary switch being operable in the other direction to reverse said cycle of successive connections, whereby said relays are selectively operated in response to direction of rotation of the switch, to produce notching impulses of uniform duration and at a frequency proportional to the speed of rotation of the switch.

2. A two-directional notching control circuit comprising a pair of notching control relays one for each direction, a common current supply condenser for both relays, a source of charging current for said condenser, a discharge circuit, and a reversible rotary switch operable in one direction of rotation to connect the condenser successively with the source of current, one of said relays, said discharge circuit, the other relay and again with the source of current, to complete a cycle repeatable in a continuous rotation of the switch in said one direction, said rotary switch being operable in the other direction to reverse said cycle of successive connections, whereby said relays are selectively operated in response to direction of rotation of the switch, to produce notching impulses of uniform duration and at a frequency proportional to the speed of rotation of the switch.

KENNETH L. CURTIS.
LAVERNE R. PHILPOTT.

REFERENCES CITED

The following references are of record in the file of this patent:

UNITED STATES PATENTS

| Number | Name | Date |
| --- | --- | --- |
| 1,485,865 | Meyer | Mar. 4, 1924 |
| 1,553,406 | Staege | Sept. 15, 1925 |
| 1,553,407 | Staege | Sept. 15, 1925 |
| 1,571,960 | Needham | Feb. 9, 1926 |
| 1,665,857 | Needham | Apr. 10, 1928 |
| 2,144,429 | Martin | Jan. 17, 1939 |
| 2,217,856 | Brady | Oct. 15, 1940 |
| 2,232,753 | Wilson | Feb. 25, 1941 |
| 2,251,388 | Bates | Aug. 5, 1941 |
| 2,258,462 | Martin | Oct. 7, 1941 |
| 2,264,865 | Taylor | Dec. 2, 1941 |
| 2,302,042 | Martin | Nov. 17, 1942 |
| 2,322,114 | Clare et al. | June 15, 1943 |

FOREIGN PATENTS

| Number | Country | Date |
| --- | --- | --- |
| 227,887 | Great Britain | June 14, 1924 |
| 538,386 | Great Britain | July 31, 1941 |